United States Patent Office 3,002,666
Patented Oct. 3, 1961

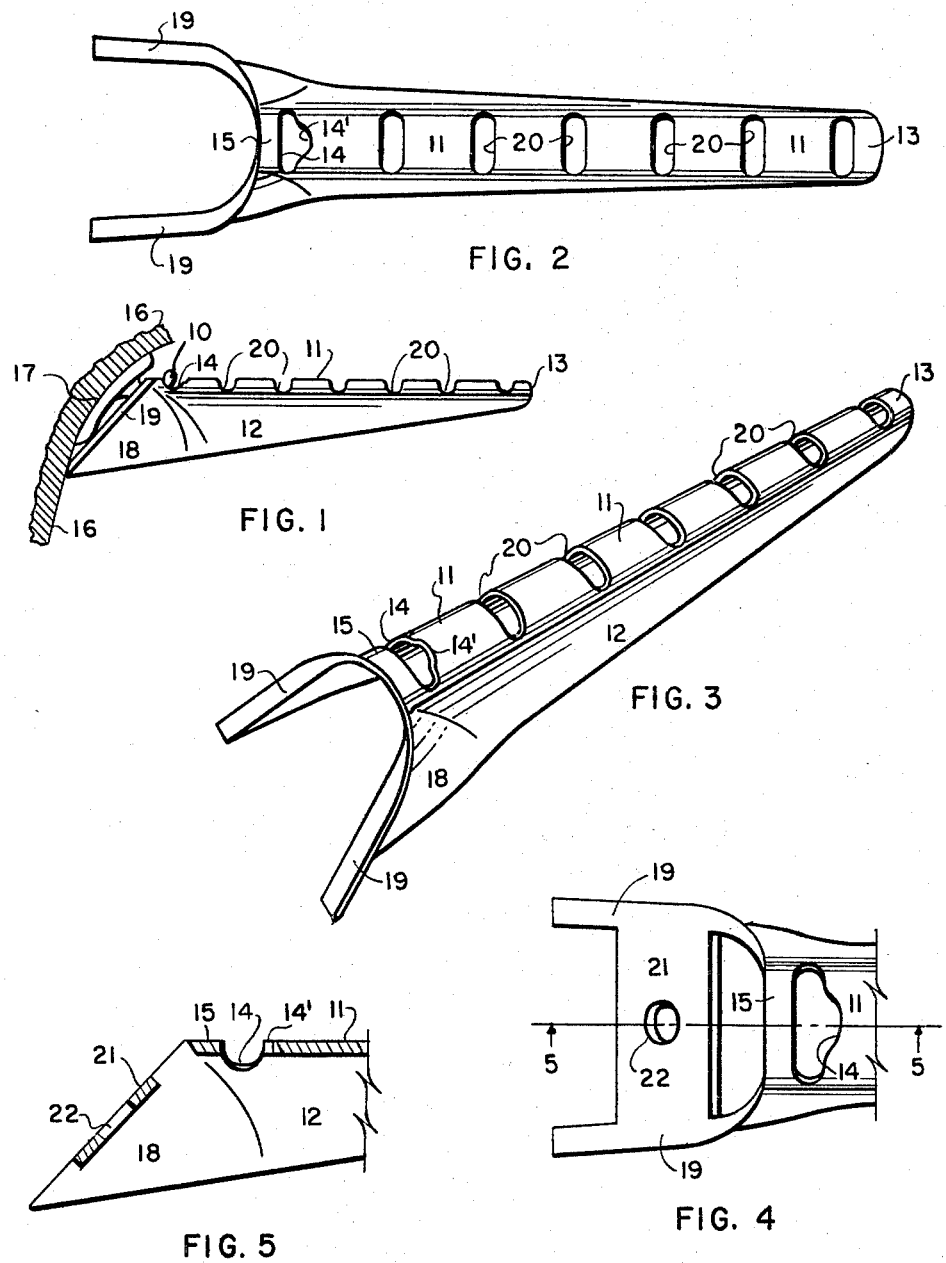

3,002,666
AUTOMOBILE HANGER BRACKET
Hyman P. Silverman, 1280 Raleigh St., Denver, Colo.
Filed Sept. 8, 1958, Ser. No. 759,599
4 Claims. (Cl. 224—42.45)

This invention relates to facilities for the practical and convenient accommodation of hanger-supported garments, and the like, interiorly of and for transportation with conventional passenger automobiles of enclosed body type, and has as an object to provide a novel and improved bracket adapted for detachable association with customary features of such automobiles as an arm appropriate for the reception and support of a plurality of garment hangers.

A further object of the invention is to provide a novel and improved automobile hanger bracket that is simple and convenient of selective manual removal and replacement in use relation with features of conventional passenger automobile body enclosures.

A further object of the invention is to provide a novel and improved automobile hanger bracket coactable in a typical embodiment with automobile body enclosures of diverse particularity.

A further object of the invention is to provide a novel and improved automobile hanger bracket susceptible of expedient production in a range of desired sizes and capacities.

A further object of the invention is to provide a novel and improved automobile hanger bracket amenable to economical production from known and available materials by means and facilities of general distribution.

A further object of the invention is to provide a novel and improved automobile hanger bracket that is self-positioning for use in mounted association with an automobile body enclosure, that is secure in use position without occasion for fixed attachment to elements of the associated body enclosure, that introduces no hazard to and little interference with passenger use of the associated body enclosure, and that is efficient in attainment of the ends for which designed.

With the foregoing and other objects in view, my invention consists in the construction, arrangement, and operative combination of elements as hereinafter set forth, pointed out in my claims, and illustrated by the accompanying drawing, in which—

FIGURE 1 is a side elevation of a typical embodiment of the invention as engaged in position of use with the appropriate feature of a conventional automobile body enclosure whereof but a sectional fragment adequate for understanding of the invention is shown.

FIGURE 2 is a top plan view, on a relatively enlarged scale, of the bracket unit according to FIGURE 1 separate from its position of use.

FIGURE 3 is an isometric view of the unit according to FIGURE 2.

FIGURE 4 is a fragmentary, top plan view, on a further enlarged scale, of the left-hand end of the unit according to FIGURE 2 as modified within the contemplation of the invention.

FIGURE 5 is a longitudinal sectional view of the modified construction according to FIGURE 4 taken substantially on the indicated line 5—5 of the latter.

The convenience and advantage of transporting hanger-supported garments in freely-depending suspension from and within conventional automobile body enclosures have had long recognition now reflected by the general, if not universal, presence of hooks 10 fixed as standard equipment to upper zones of the enclosure side walls in upwardly-opening extension interiorly thereof, usually as a spacedly-opposed pair within the rear passenger compartment of the body, in a disposition appropriate for engagement by the loops and hooks of conventional garment hangers thereby supported for suspension of their burdens interiorly of the enclosure. The conventionally-supplied hooks 10 are commonly adequate in construction and attachment to the enclosure to support the suspended weight of several hangers and the associated garments, and are frequently so used, but the congestion of hangers and associated garments in suspension from a single hook adversely complicates the selection and removal of a desired such unit from the hook, results in compaction of the so-suspended garments productive of wrinkling and mussing thereof, and restricts the load capacity of the hook. Corrective of the single hook disadvantages above noted with enhanced utilization of the load-carrying potential thereof, the improvement of the instant invention is a simple, practical, unitary facility removably and replaceably coactable with any one of the known conventional hooks 10 as an inward bracket extension therefrom adapted to function as a substantially horizontal arm for the accommodation of a spaced succession of hanger and associated garment units separately engaged therewith.

As typified by the views of the drawing, the bracket unit of the invention is an elongated, longitudinally-straight member of inverted U-shape in transverse section, formed from any suitable rigid material of appropriate strength, such as sheet metal, or the equivalent, in any expedient or desired manner to symmetrically taper in width from a greater end to a lesser end and to provide an exteriorly and transversely convex top wall 11 conjoining spacedly-opposed, complementary side walls 12 similarly extending, preferably in parallel at each transverse zone of the unit, from mergence with side margins of the top wall 11 to free margins inclined in the side wall planes to establish a tapered side wall width corresponding in direction with and in planes perpendicular to that of the member taper. The wider portions of the side walls 12 combine with the top wall 11 at the same end of the unit to form the greater end thereof, from which said walls converge to establish a lesser unit end 13 which is preferably smoothly rounded for non-hazardous projection as the free end of the unit when mounted for use.

Adapting the unit comprised from the walls 11 and 12 for supported coaction with a conventional hook 10, a notch 14 is formed in transversely-intersecting relation with the top wall 11 inwardly adjacent the greater end of the unit to leave at the end of said wall a transverse terminal web 15 of a width receivable through the upwardly-directed throat of the hook. The notch 14 is of an open width sufficient to pass the free end of the hook 10 and may expediently be laterally enlarged at its side remote from the web 15, as at 14', to provide adequate clearance for hook ends of varying sizes and particular conformations. A feature of the invention is the provision at the greater end of the unit of an abutment adapted to bear against the zone of a body enclosure side wall 16 adjacent the attachment plate 17 of the hook 10 in such correlation with the notch 14 as to locate and maintain the unit in substantially horizontal projection of its top wall 11 away from a hook wherewith said notch is engaged, which said abutment is defined by the correspondingly outwardly and downwardly inclined margins of triangular extensions 18 of the unit side walls 12 at the greater ends thereof. The extensions 18 are expediently integral with their respective side walls 12, are limited at one side by free margins colinear with the free margins of their side walls, and present abutment-defining unit end margins in a plane transverse of the unit inclined from the outer edge of the web 15 at an obtuse angle from the line of the top wall 11 which approximates the inclination of the body enclosure side wall engaged by the hook plate 17. While the extensions 18 may be coplanar with their side walls, the size and form of various hook plates 17 conventionally encountered establishes as desirable that said extensions be divergently and outwardly bowed with respect to their associated side walls 12 to provide therebetween an open area adequate to embracingly receive the plate 17 of a hook 10 engaged by the unit, and while the abutment-defining margins of said extensions 18 may be in thickness the same as the material from which they are formed, stability of unit mounting and protection of body enclosure interior finish point the desirability of laterally widening said margins, as by means of integral, outwardly-directed flanges 19.

Completing the unit for its intended use, the convex surface of the top wall 11 is interrupted at spaced intervals, preferably uniform, by means, such as transverse notches 20, adapted for engagement by the loops or hooks of conventional garment hangers in a manner to retain the same relative to the horizontally-extended arm of the mounted unit.

Practical use of the improved unit in association with a body enclosure equipped with a hook, or hooks, 10 is simple and convenient. It being desired to transport a plurality of hanger-supported garments, the greater end of the unit is presented to the hook 10, the latter is entered through the notch 14, and the free end 13 of the unit is lowered until the abutment-defining margins of the side wall extensions 18 bear against the exposed surface of the body side wall 16 at opposite sides of the hook plate 17, whereby to position and brace the bracket unit with its top wall substantially horizontal and interiorly transverse of the enclosure as an arm upon and from which the hanger-supported garments may be individually hung in an obvious manner.

The modified construction according to FIGURES 4 and 5 merely adds to the foregoing an attachment feature useful for mounting of the bracket unit in desired positions of use apart from the hook 10, and is characterized by the provision of a web 21 fixedly bridging between the abutment-defining margins of the side wall extensions 18 in a spacing outwardly from the web 15 and a hole 22 centrally of said web 21 for the reception of a fastener, such as a screw, whereby said web and its coplanar flanges 19 may be secured conformably against a correspondingly-inclined surface to mount the bracket as an horizontally-extending arm employable for garment support as above described.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention—

1. A hanger bracket adapted for detachable mounted association with an upwardly-opening hook conventionally affixed interiorly of an automobile body enclosure, comprising an elongated, rigid member of inverted U-shape in transverse section symmetrically tapered in width from a greater end to a lesser end and formed with a transversely-convex top wall and with complementary side walls integrally depending from the side margins of said top wall symmetrically and correspondingly tapered in width from a minimum at the lesser end of the member to a maximum at the greater end of the latter, a spaced succession of transverse notches exteriorly interrupting said top wall, an eye coactable with said hook formed in said top wall inwardly adjacent the greater end of the member, and integral, triangular extensions from the wider ends of said side walls similarly tapered in width longitudinally and outwardly from said wider ends to present abutment-defining edges determining a plane transverse of the member in obtuse angular relation with the length of said top wall.

2. The organization according to claim 1, wherein the abutment-defining edges of said triangular extensions are laterally flanged in the plane thereby determined.

3. The organization according to claim 1, wherein said triangular extensions are divergently flared laterally of the associated side walls to embracingly receive the mounting plate of the conventional hook.

4. The organization according to claim 1, wherein a centrally-apertured web fixedly conjoins the abutment-defining edges of said triangular extensions in coplanar relation therewith.

References Cited in the file of this patent

UNITED STATES PATENTS

| | | |
|---|---|---|
| D. 181,237 | Spielman | Oct. 15, 1957 |
| 320,938 | Knowlton | June 30, 1885 |
| 325,196 | Caldwell | Aug. 25, 1885 |
| 1,569,278 | Hickman | Jan. 12, 1926 |
| 1,700,253 | Davis | Jan. 29, 1929 |
| 2,229,704 | Markel | Jan. 28, 1941 |
| 2,244,624 | Kanter | June 3, 1941 |
| 2,427,335 | Antonia et al. | Sept. 16, 1947 |
| 2,500,423 | Martin | Mar. 14, 1950 |

FOREIGN PATENTS

| | | |
|---|---|---|
| 1,152,819 | France | Sept. 9, 1957 |
| 493,686 | Great Britain | Oct. 12, 1938 |